Dec. 13, 1966    M. R. LEE ETAL    3,292,144

METHOD FOR SHAPING THE FREQUENCY SPECTRUM OF SEISMOGRAPHIC DATA

Filed Nov. 20, 1963    5 Sheets-Sheet 1

INVENTORS
MILFORD R. LEE &
DONALD E. DUNSTER
BY William J. Miller
ATTORNEY

Dec. 13, 1966    M. R. LEE ETAL    3,292,144
METHOD FOR SHAPING THE FREQUENCY SPECTRUM OF SEISMOGRAPHIC DATA
Filed Nov. 20, 1963    5 Sheets-Sheet 2
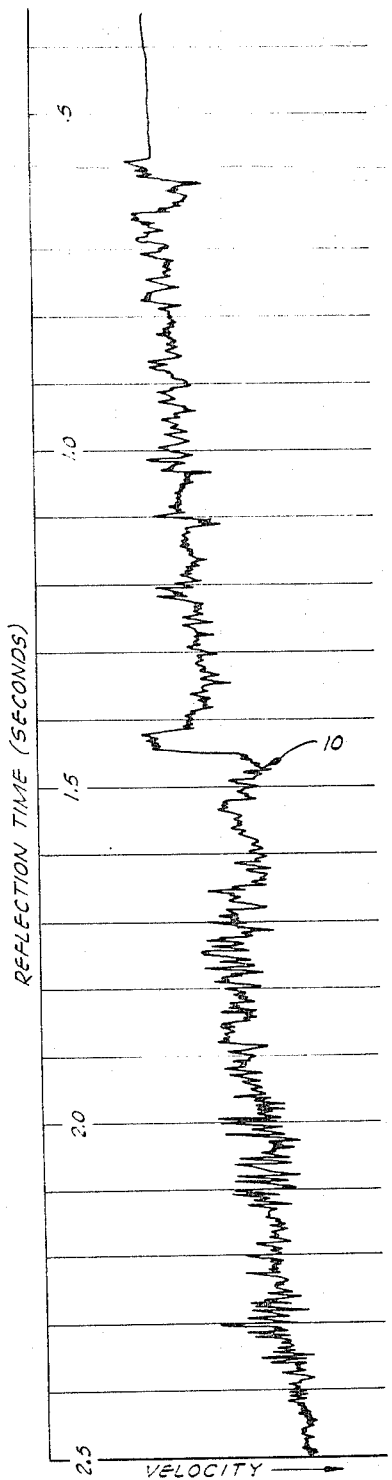
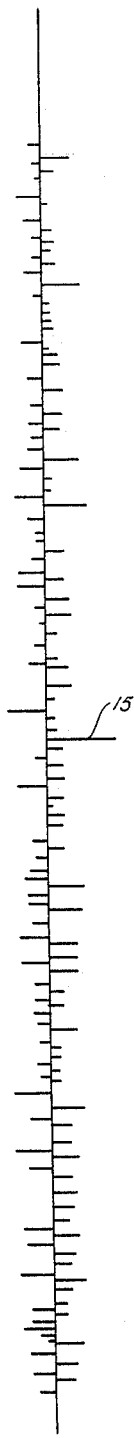
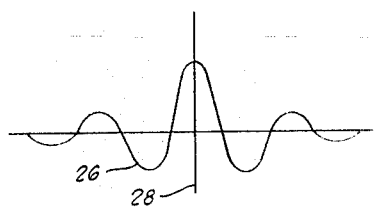
FIG.4
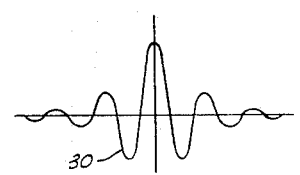
FIG.5
FIG.2    FIG.3
INVENTORS.
MILFORD R. LEE &
DONALD E. DUNSTER
BY
William J. Miller
ATTORNEY

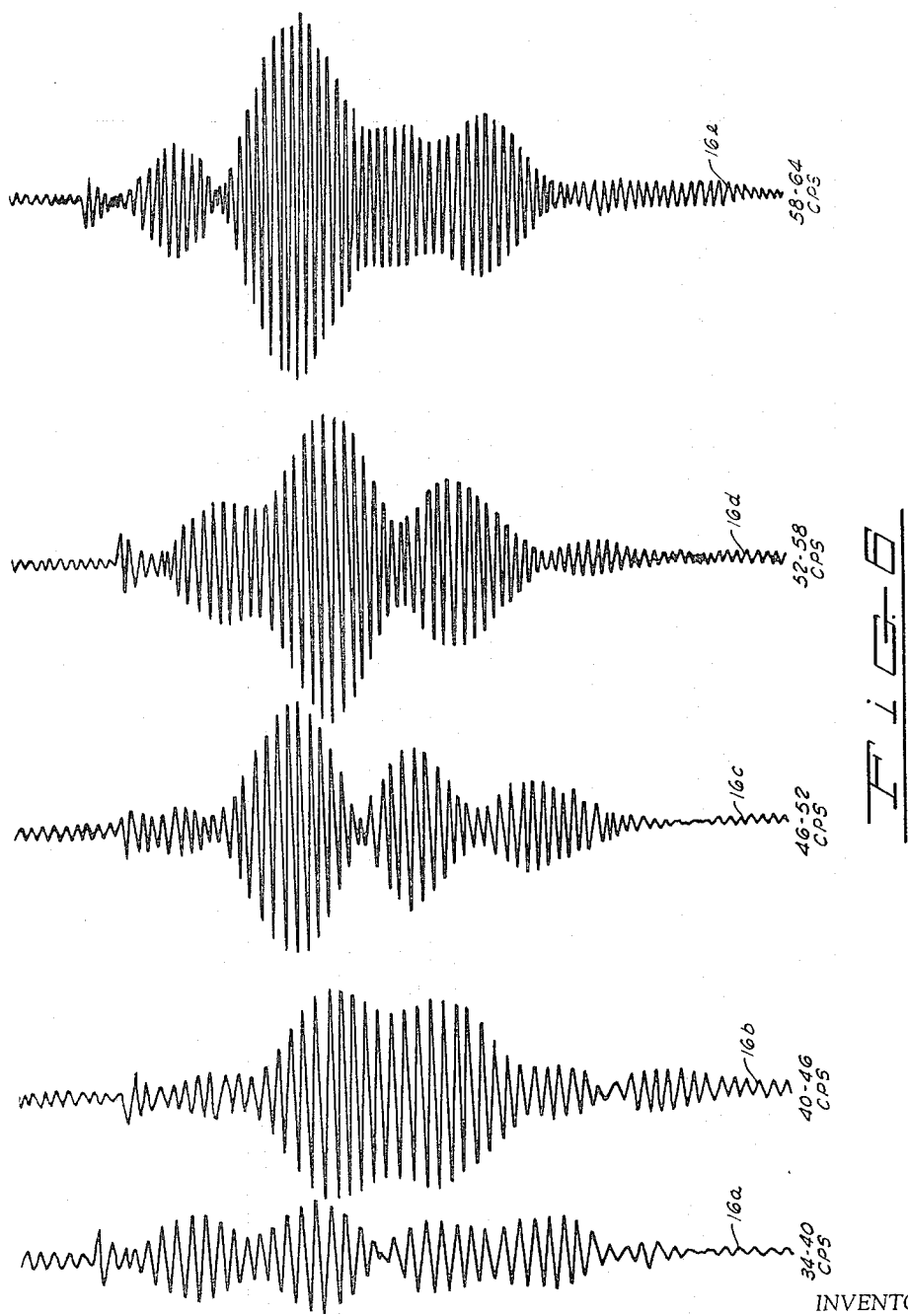

Dec. 13, 1966 M. R. LEE ETAL 3,292,144
METHOD FOR SHAPING THE FREQUENCY SPECTRUM OF SEISMOGRAPHIC DATA
Filed Nov. 20, 1963 5 Sheets-Sheet 4

INVENTORS
MILFORD R. LEE &
DONALD E. DUNSTER
BY
ATTORNEY

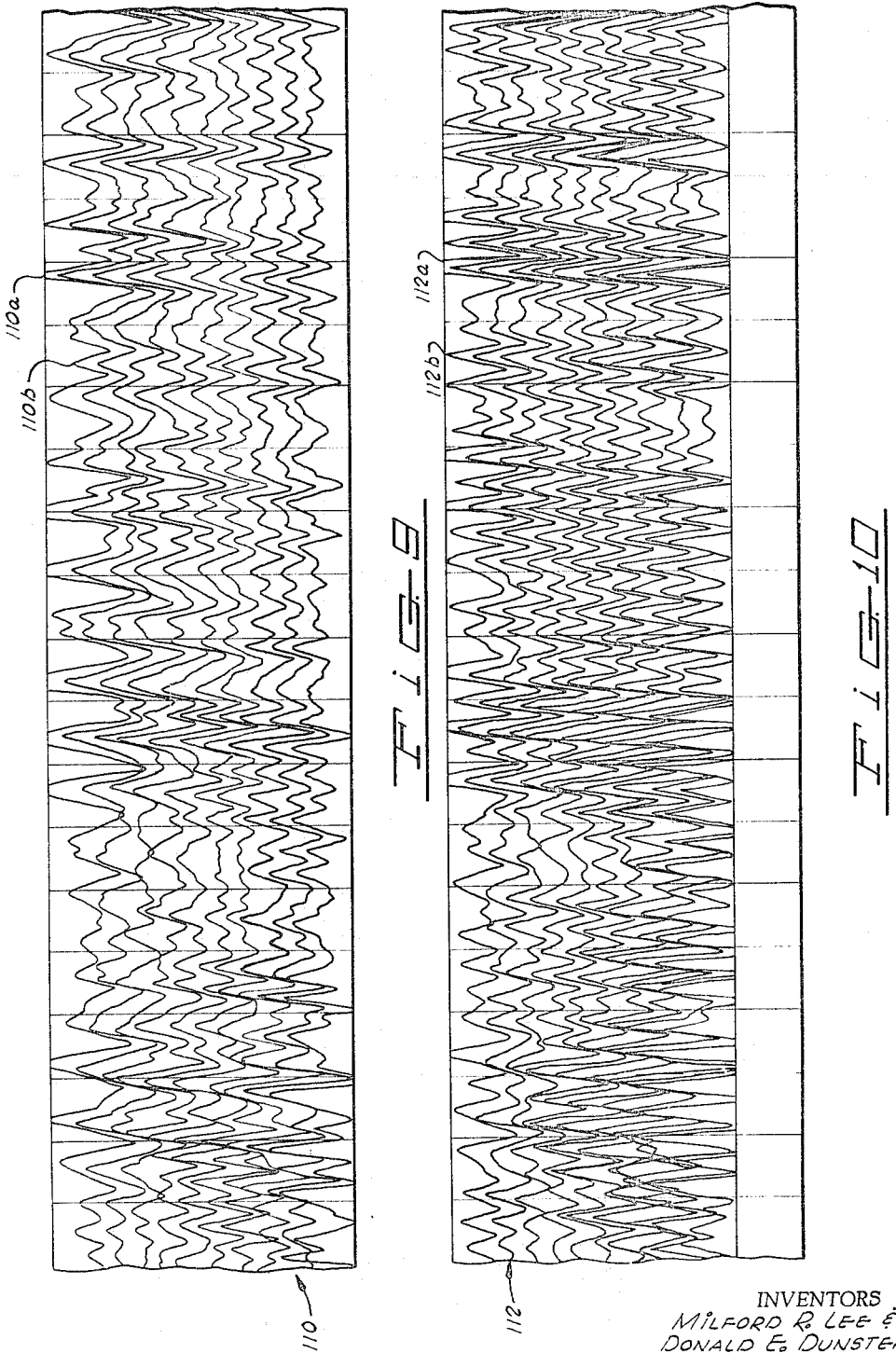

United States Patent Office 3,292,144
Patented Dec. 13, 1966

3,292,144
METHOD FOR SHAPING THE FREQUENCY SPECTRUM OF SEISMOGRAPHIC DATA
Milford R. Lee and Donald E. Dunster, both of Ponca City, Okla., assignors to Continental Oil Company, Ponca City, Okla., a corporation of Oklahoma
Filed Nov. 20, 1963, Ser. No. 325,018
4 Claims. (Cl. 340—15.5)

The present invention relates to the processing of seismographic data, and more particularly, but not by way of limitation, relates to an improved method for normalizing or reshaping the frequency spectrum of seismic data to compensate for attenuation effects of the earth.

Although the present invention may also be used to advantage in connection with other, more conventional types of seismographic surveying, the invention is particularly related to the type of geophysical prospecting described in its various aspects in U.S. Patents Nos. 2,688,124; 2,808,577; 2,874,795; 2,910,134 and 2,981,928, which are assigned to the assignee of the present invention. In this type of seismographic surveying a seismic sweep signal having a relatively low energy level but of a nonrepetitive, controlled frequency content and of relatively long duration is generated by a suitable transducer. The transducer may be electrically, mechanically or hydraulically powered, but in any event is operated in close synchronization with a reference sweep signal so as to reproduce the reference sweep signal in the form of seismic energy in the earth. The sweep signal persists for several seconds over which period of time it may vary between a low frequency on the general order of 10 c.p.s. and a high frequency on the order of 100 c.p.s. A typical seismic sweep signal may vary uniformly either between the low frequency and the high frequency, in which case it is referred to by workers in the art as an upsweep, or from the high frequency down to the low frequency, in which case it is referred to as a downsweep.

The seismic sweep signal generated by the transducer propagates downwardly and a portion of the seismic energy is reflected by each successive interface and travels back to the surface where it is detected by geophones and recorded by some suitable means. Since the total time required for the sweep signal to travel downwardly to even the deepest interfaces and return to the surface will normally be less than the time duration of the sweep signal itself, the various reflections from the various subsurface interfaces are not separated in time, but overlap such that the seismic signal detected by the geophones is very complex and does not immediately reveal the desired information regarding the travel time of the signal to and from the various interfaces. However, by correlating the received complex signal with the sweep signal originally generated in the earth, the precise time required for the seismic signal to travel downwardly and be reflected from each of the subsurfaces can be determined and the interfaces located with considerable accuracy.

The correlation process entails moving the entire length of the sweep signal lengthwise over the entire length of the complex signal to produce a continuous correlation signal. Each time that the sweep signal corresponds with a portion of the complex signal, an auto-correlation pulse is generated and indicates a seismic event. If a relatively wide band width signal is efficiently induced in the earth and retrieved, the auto-correlation pulse will be relatively sharp so that the resolution of the seismic event will be good. However, if a relatively narrow band width sweep signal is used, or if the seismic energy actually received from the earth has a relatively narrow band width, the auto-correlation pulse will be considerably broader and less discrete so that precise identification of the seismic events is difficult.

As seismic energy propagates through the earth and is reflected by subterranean interfaces, some portion of the frequency spectrum of the seismic energy is invariably attenuated more than others. Whenever the amplitudes of the frequencies of the seismic energy are not equal, the effective result is the same as if the band width of the seismic energy is reduced. For this reason, the term "broad band width seismic energy" is normally considered to include the condition that all represented frequencies have substantially the same amplitude.

A method and apparatus for adjusting the amplitudes of the various portions of the frequency spectrum is described in U.S. application Serial No. 324,968 entitled, "Method and Apparatus for Compiling, Compositing, Correlating and Normalizing Seismographic Data," filed by Donald E. Dunster on November 20, 1963, and U.S. application Serial No. 325,072 entitled, "Method and Apparatus for Correlating and Normalizing Signals," filed by Harney et al. on November 20, 1963, both of which are assigned to the assignee of the present invention. Another method and apparatus for performing the correlation and normalizing function is described in copending U.S. application Serial No. 273,634 entitled, "Method and Apparatus for Correlating Two Recorded Signals," filed by Jesse T. Cherry, Jr., et al., on April 17, 1963, which is also assigned to the assignee of the present invention. In both instances, substantially equal band width segments of the seismic energy are filtered from the correlation signal and the relative amplitudes of the filter signals adjusted to compensate for the attenuation effects of the earth. In this procedure, a particular time zone of interest is selected and the relative amplitudes of the various filter signals adjusted to equal values. In many cases this procedure is adequate. However, the results sometimes indicate that the seismic energy has not been properly normalized. We have discovered that in many cases the relative amplitudes of the filter signals in a particular time zone of interest should not be equal but instead may vary over a substantial range because of the particular bed spacing in the locality. For example, the bed spacing may be such as to cause net cancellation of one frequency band at a given time zone or depth while reinforcing other frequency bands. It has also been discovered by other workers in the art that this reinforcement and cancellation of the various frequency bands is the source of some of the most valuable information available through use of the seismic data so that it is highly desirable not to distort or otherwise affect this information. Therefore, in some instances where the cancellation or reinforcement is appreciable, the adjustment of the reflected seismic energy to a common amplitude hinders rather than assists in extracting the desired information from the data. In other words, frequently it is impossible to determine what portion of the differences in relative amplitudes of the band segment filter signals is caused by attenuation of the earth, for which it is desired to correct, and what portion is caused by reinforcement and cancellation, which it is desired to preserve and detect.

Therefore, we have discovered that the relative amplitudes of the filter segments can be properly adjusted by utilizing downhole velocity log data to produce, by means of a digital computer, or other suitable means, a plurality of synthetic seismogram frequency band parts representative of a particular area, with each seismogram representing the theoretically perfect seismogram which would be produced by seismic energy having a frequency band corresponding to the frequency band of the particular seismogram part.

Therefore, an object of the present invention is to provide an improved method for reshaping the frequency spectrum of seismic data to compensate for attenuation of the seismic energy by the earth without adversely distorting the desired information.

Another object of the present invention is to provide an improved method for processing seismographic data.

Another object of the present invention is to provide a method for increasing the readability of processed seismic data.

Yet another object of the present invention is to provide greater resolution of seismic information.

Many additional objects and advantages of the present invention will be evident to those skilled in the art from the following detailed description and accompanying drawings, wherein:

FIG. 2 is a reproduction of a downhole velocity log trace of the type which may be used in the method of the present invention;

FIG. 3 is a schematic illustration which serves to assist in describing the method of the present invention;

FIGS. 4 and 5 are schematic graphs representative of seismic energy impulses and serve to assist in describing the method of the present invention;

FIG. 6 is a reproduction of five synthetic seismograms and serves to illustrate one step of the method of the present invention;

FIG. 9 is a reproduction of seismic data processed in accordance with the prior art methods; and, FIG. 10 is a reproduction of the same seismic data processed in accordance with the present invention.

Figure 1:
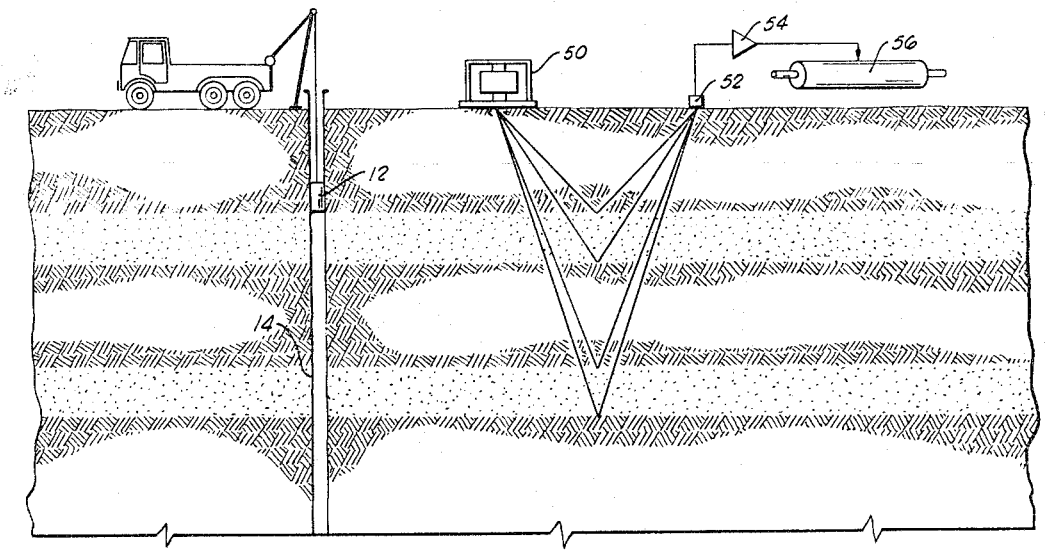
FIG. 1 is a schematic vertical sectional view of a segment of the earth which assists in describing the method of the present invention.

Referring now to the drawings, a downhole acoustical velocity log, represented by the two-way travel time trace 10, is compiled by lowering a suitable acoustical velocity measuring tool 12 through a well bore 14 in the general locality of interest where seismic data to be processed has been accumulated. In this regard, it will be appreciated that a well bore a substantial distance away may provide valuable velocity data, provided the lithological geometry and makeup of the formation through which the well bore is drilled is similar to that of the area from which the seismic data to be normalized has been accumulated. The downhole velocity log is normally compiled by lowering the logging tool 12 to the bottom of the well bore and then measuring the sonic or acoustic velocity at predetermined intervals as the logging tool is raised. The measured velocities are of course recorded with respect to depth. The velocity data can then be converted to two-way travel time by a well-known mathematical process to produce the velocity log 10 of FIG. 2. In most instances this conversion will be accomplished using a digital computer and merely entails utilizing the measured velocity for each increment of travel along the path to compute the time required for the seismic energy to travel to the particular depth and return, and then plotting the velocity value at the appropriate point on the time scale.

Next a plurality of synthetic seismograms, such as those indicated by the reference numerals 16a, 16b, 16c, 16d and 16e in FIG. 6, are produced from the downhole velocity log of FIG. 2. This is accomplished by a well-known mathematical process which can also be performed by a digital computer. Any one of the mathematical process and computer programs described in the following references may be used for the purpose:

(a) Wuensohel, P. C., 1960 "Seismogram Synthesis Including Multiples and Transimission Coefficients," Geophysics, vol. 25, pp. 106–129.

(b) Peterson, R. A., W. R. Fellippone, and F. B. Coker, 1955, "The Synthesis of Seismograms from Well Data," Geophysics, vol. 20, pp. 516–538.

In general, these methods are accomplished almost entirely with the assistance of digital computers and entail the process of dividing the velocity log into equal increments of time. Then for each increment of time $i$ the seismic reflection coefficient $R_i$ is computed using the formula:

$$R_i = \frac{V(i+1) - V_i}{V(i+1) + V_i}$$

where $V_i$ is the velocity in the increment $i$ and $V(i+1)$ is the velocity in the next lower increment. A spike impulse having a length and direction representative of the magnitude and size of the reflection coefficient $R_i$ is then provided for each increment $i$, as illustrated by the spike 15 in FIG. 3, for example.

Next an impulse is substituted for each of the spikes to produce a component part seismogram representative of a seismogram having a frequency band corresponding to the frequency band of the impulse. For example, the impulse 26 of FIG. 4 might represent an impulse having a band width of 34–40 c.p.s. In other words, if all frequencies between 34–40 c.p.s. of infinite length were oriented to have zero phase at the center line 28, the sum of the frequencies would equal the impulse signal 26. Therefore, when each of the spikes were replaced by an impulse having a shape corresponding to the shape of the impulse 26 and having an amplitude and direction corresponding to the size and direction of the spike, the multitude of impulse signals overlap to a great extent and the sum of the impulse produces the component part trace 16a of FIG. 6 which is then said to be the theoretically ideal seismogram which would result from a seismic energy impulse having a frequency band of 34–40 c.p.s.

Component part seismograms 16b–16e are produced in the same manner from the spike data of FIG. 3. The impulse for the trace 16b, which has a frequency band of 40–46 c.p.s., might be quite similar to the impulse 30 of FIG. 5. It will be noted that the impulse 30 is substantially sharper than the impulse 26 so that the sum of the impulses will be a higher frequency signal. The component part seismograms 16c, 16d and 16e are similarly produced by substituting the proper impulse signals having frequency bands 46–52, 52–58, and 58–64 c.p.s. respectively, so that the five component part seismograms represent a total frequency spectrum from 34–64 c.p.s., and when summed would produce a single synthetic seismogram having a band width of 34–64 c.p.s. In FIG. 6 it will be appreciated that the zero time of the several traces is at the top and the two-way travel time is oriented along the vertical axis. It will be noted that in any particular time zone of interest the relative amplitudes of the traces 16a–16e may or may not be substantially equal and in many cases are quite different.

Referring once again to FIG. 1, the seismic field data to be normalized is obtained by operating a seismic transducer 50 in synchronism with a sweep signal having a frequency band of 34–64 c.p.s. to generate a corresponding seismic sweep signal which propagates downwardly through the earth and is reflected by the various interfaces and detected by geophones 52. The detected seismic reflections are then amplified by an amplifier 54 and recorded on a record sheet 56 disposed on a recording drum. As previously mentioned, the seismic data may be obtained in the general locality of the well bore from which the velocity log was taken and from a geophysical standpoint this may include a considerable area in many cases so long as the lithology remains substantially the same.

Figure 7:
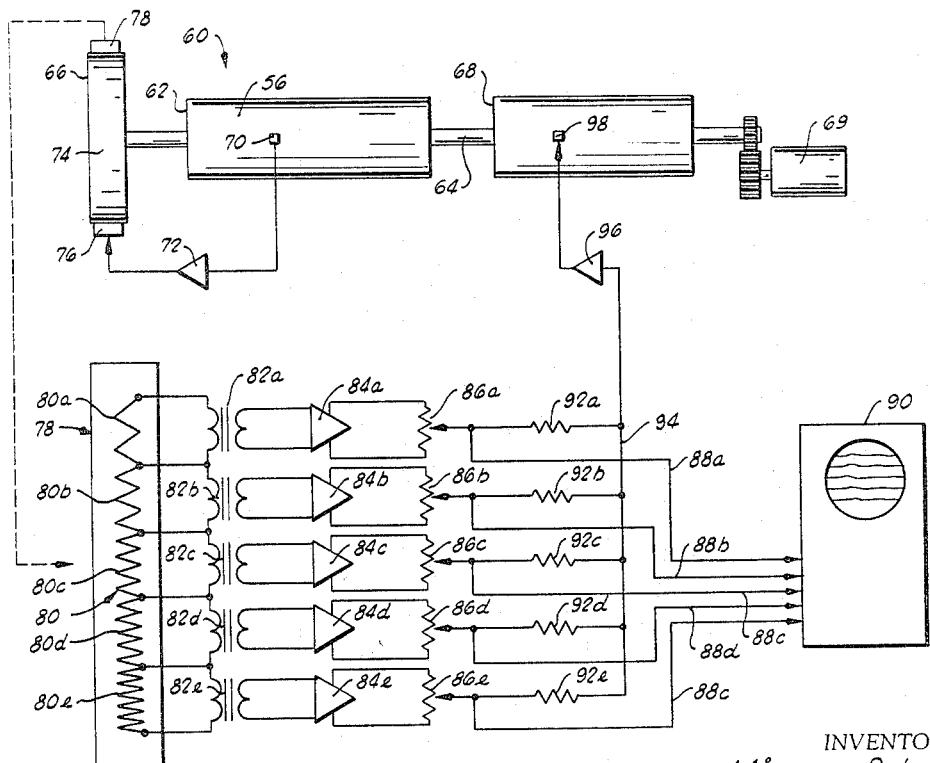
FIG. 7 is a schematic electrical circuit diagram of apparatus which can be used in practicing the method of the present invention.

The seismic data recorded on the record sheet 56 is then transferred to the apparatus indicated generally by the reference numeral 60 in FIG. 7 and placed around a reproducing drum 62. The drum 62 is connected by a common shaft 64 to a correlation drum 66 and a recording drum 68 and the shaft 64 is driven by a drive means 69. The seismic data is then reproduced from the record sheet 56 by a head 70, amplified by an amplifier 72, and recorded on the magnetic surface 74 of the correlation drum 66 by a head 76. The signal recorded on the correlation drum 66 induces an E.M.F. in an elongated correlation head 78 having an electrical conductor 80 which corresponds in shape to the sweep signal used to control the transducer 50. The conductor 80 is divided into a plurality of segments, five in the example illustrated, which are designated 80a, 80b, 80c, 80d and 80e. The five segments then correspond to the component part frequency bands of 34–40, 40–46, 46–52, 52–58 and 58–64 c.p.s., respectively. Isolation transformers 82a–82e are connected across the segments 80a–80e, respectively, to isolate the E.M.F. generated in each of the segments and produce component part correlation signals having corresponding frequency content, as will presently be described. Amplifiers 84a–84e are connected to the secondary windings of the transformers 82a–82e, respectively, and amplify the component part correlation signals and apply them to variable resistors 86a–86e, respectively. The sliding contacts of the variable resistors 86a–86e are connected by leads 88a–88e, respectively, to the five channels of an oscilloscope 90. The sliding contacts of the variable resistors are also connected through resistors 92a–92e, respectively, to a collector conductor 94 for mixing the various component part correlation signals. The conductor 94 is connected to an amplifier 96 which in turn is connected to a recording head 98 operatively disposed adjacent the magnetic recording surface of the recording drum 68.

When using the apparatus 60 to practice the method of the present invention, the complex signal received by the geophones 52 and recorded on the record sheet 56 is reproduced by the head 70 and recorded on the correlation drum 66 by the recording head 76. As the complex seismic signal passes by the conductor 80, an E.M.F. is generated in each of the segments 80a–80e. The E.M.F. generated in each segment at any point in time corresponds to the amplitude of the energy in the complex seismic data that lies within the frequency band of the particular conductor segment and constitutes what is herein termed a "component part correlation signal." The component part signals are then isolated by the respective transformers 82a–82e, amplified by the amplifiers 84a–84e and applied to the variable resistors 86a–86e. Prior to adjustment of the amplitudes, the component part signals applied to the variable resistors 86a–86e might correspond to the component part traces 100a–100e of FIG. 8. The component part traces 100a–100e represents the amplitudes of seismic energy actually received by the geophones 52 having frequencies within the particular bands. For example, the amplitude of the component part trace 100a would correspond to the amplitude of the seismic energy within the 34–40 c.p.s. frequency band, the trace 100b would represent the energy in the 40–46 c.p.s. frequency band, as indicated in FIG. 8.

Figure 8:
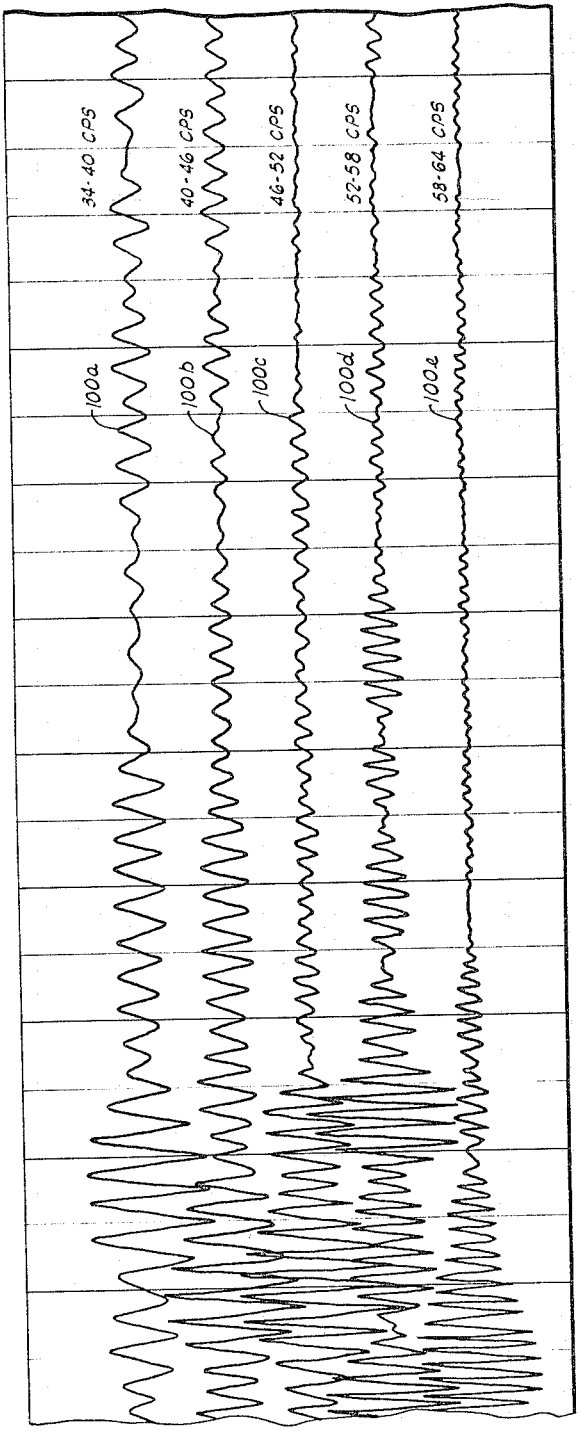
FIG. 8 is a reproduction of the signals of an intermediate step of the method of the present invention.

The traces 100a–100e will then be fed through the sliding contacts of the variable resistors 86a–86e and through the leads 88a–88e to the oscilloscope 90 where they will be displayed substantially as illustrated in FIG. 8. Then the variable resistors 86a–86e are adjusted until the relative amplitudes between the component part correlation traces 100a–100e in a particular time zone of interest correspond to the relative amplitudes of the synthetic component part seismic traces 16a–16e, respectively. In other words, the relative amplitudes between the trace 100a and the trace 100b, for example, are made to correspond to the relative amplitudes between the traces 16a and 16b in the same time zone. Therefore, if the amplitude of the trace 16a in the time zone of interest is twice the amplitude of the trace 16b, then the amplitude of the trace 100a in the same time zone of interest is adjusted to twice the amplitude of the trace 100b in the time zone of interest. The component part correlation signals at the sliding contacts of the variable resistors 86a–86e are then combined after the adjustment by the collector conductor 94 and recorded as a correlated and normalized seismogram by the recording head 98 on the recording drum 68.

Referring to FIG. 9, ten separate correlated seismograms recorded by ten adjacent geophones are illustrated on the sheet 110. These seismograms were produced in the manner described above except that the relative amplitudes of the frequency band component signals were not adjusted in accordance with the present invention. The record sheet 112 of FIG. 10 is a reproduction of ten traces produced from the same seismic data as the ten traces of FIG. 9 except that the seismic data was normalized in accordance with the method of the present invention by adjusting the relative amplitudes of the frequency components to correspond to the relative amplitudes of the synthetic frequency components compiled from a downhole velocity log as previously described. It will be obvious to those skilled in the art that the degree of resolution of seismic data of FIG. 10 is far greater than that of FIG. 9. For example, compare the seismic events 112a with the corresponding seismic events 110a of the traces of FIG. 9, and the events 112b with the events 110b.

From the above detailed description it will be evident that a very useful method for normalizing seismic data to compensate for the attenuation effects of the earth has been disclosed. The method provides a means by which the relative amplitudes of the component part correlation signals can be adjusted to overcome the attenuation effects without adversely affecting the reinforcement and cancellation data which reveals the interface spacing. Although the method is described in connection with and is particularly useful in connection with the method of seismographic surveying employing a seismic sweep signal and subsequent correlation to the complex reflection data with the sweep signal, it is to be understood that in its broader aspects the method can be used in connection with any seismic data which can be split into the component part signals having particular frequency bands. Of course, the synthetic component part seismograms would be produced having corresponding frequency bands in order to provide the desired relative amplitude information. It will also be appreciated that the number of component part signals and the frequency band of each may be varied without departing from the present invention. However, if the frequency bands of each component part are too broad, no appreciable adjustment will be made, and if too narrow, some of the cancellation and reinforcement data will be adversely affected. In general, component part frequency bands substantially as disclosed have proven satisfactory.

Although the method of the present invention has been disclosed in its preferred embodiment, it is to be understood that various changes, substitutions and alterations can be made in the steps thereof without departing from the spirit and scope of the invention as defined by the appended claims.

What is claimed is:

1. An improved method for normalizing seismic field data from a geological locality to compensate for amplitude attenuation caused by the earth comprising the steps of:

synthesizing a seismogram from a downhole velocity log made in the immediate geological locality where said seismic field data was acquired, and adjusting the relative amplitudes of predetermined frequency band components of the seismic field data to correspond to the relative amplitudes of corresponding frequency band components of said synthesized seismogram produced from the geological locality.

2. An improved method for normalizing seismic field data from a geological locality to compensate for amplitude attenuation caused by the earth comprising the steps of:

obtaining a velocity log from said geological locality;

producing at least two component part synthetic seismograms from said velocity log taken from the geological locality, said synthetic seismograms having different frequency bands and relative amplitudes for any time zone;

separating the seismic field data into a corresponding number of component part signals having relative amplitudes and corresponding frequency bands;

adjusting the relative amplitudes of the component part signals in a particular time zone to correspond to the relative amplitudes of the corresponding component part synthetic seismograms; and, mixing the adjusted component part signals to produce normalized seismic data in which the adverse effects of attenuation have been reduced.

3. An improved method for normalizing seismic field data from a geological locality to compensate for amplitude attenuation caused by the earth comprising the steps of:

compiling a velocity log of a well bore in the geological locality;

producing at least two component part synthetic seismograms from the velocity log, the component part synthetic seismograms having different frequency band widths which combine to produce a greater frequency band width and have relative amplitudes in corresponding time zones;

filtering the seismic field data into a corresponding number of component part signals having corresponding frequency bands and relative amplitudes in corresponding time zones;

adjusting the relative amplitudes of the component part signals in a particular time zone to correspond to the relative amplitudes of the corresponding component part synthetic seismograms; and, mixing the adjusted component part signals to produce normalized seismic data in which the adverse effects of attenuation have been reduced.

4. An improved method for normalizing seismic field data from a geological locality to compensate for amplitude attenuation caused by the earth comprising the steps of:

compiling a sonic velocity log with respect to depth of a well bore in the geological locality;

converting the sonic velocity log to a velocity log with respect to travel time;

computing the seismic reflection coefficient for each increment of time along the velocity log with respect to travel time;

producing a plurality of component part synthetic seismograms, each component part synthetic seismogram being produced by substituting a band width equivalent impulse having an amplitude and sign of each of the computed reflection coefficients and summing the overlapping portions of the impulses, the band width equivalent impulses having different band widths which collectively produce a larger band width, the produced synthetic seismograms having relative amplitudes in corresponding time zones;

inducing a seismic sweep signal in the earth and detecting and recording the seismic reflections therefrom with respect to time;

correlating the seismic reflections with the seismic sweep signal to produce an impulse equivalent correlation signal having a total band width;

separating the correlation signal into component part correlation signals, each having a different frequency band corresponding to the frequency bands of the component part synthetic seismograms and having relative amplitudes in corresponding time zones;

adjusting the relative amplitudes of the component part correlation signals in a time zone to correspond to the relative amplitudes of the component part synthetic seismograms in the corresponding time zone; and, mixing the adjusted component part correlation signals to produce a normalized correlation signal in which the adverse attenuation effects have been reduced.

References Cited by the Examiner

UNITED STATES PATENTS

| | | | |
|---|---|---|---|
| 2,794,965 | 6/1957 | Yost | 340—15.5 |
| 3,011,582 | 12/1961 | Peterson | 181—.5 |
| 3,108,249 | 10/1963 | Clement | 340—15.5 |
| 3,180,445 | 4/1965 | Schwartz et al. | 181—.5 |

SAMUEL FEINBERG, *Primary Examiner.*

BENJAMIN A. BORCHELT, *Examiner.*

R. M. SKOLNIK, *Assistant Examiner.*